United States Patent Office 3,074,923
Patented Jan. 22, 1963

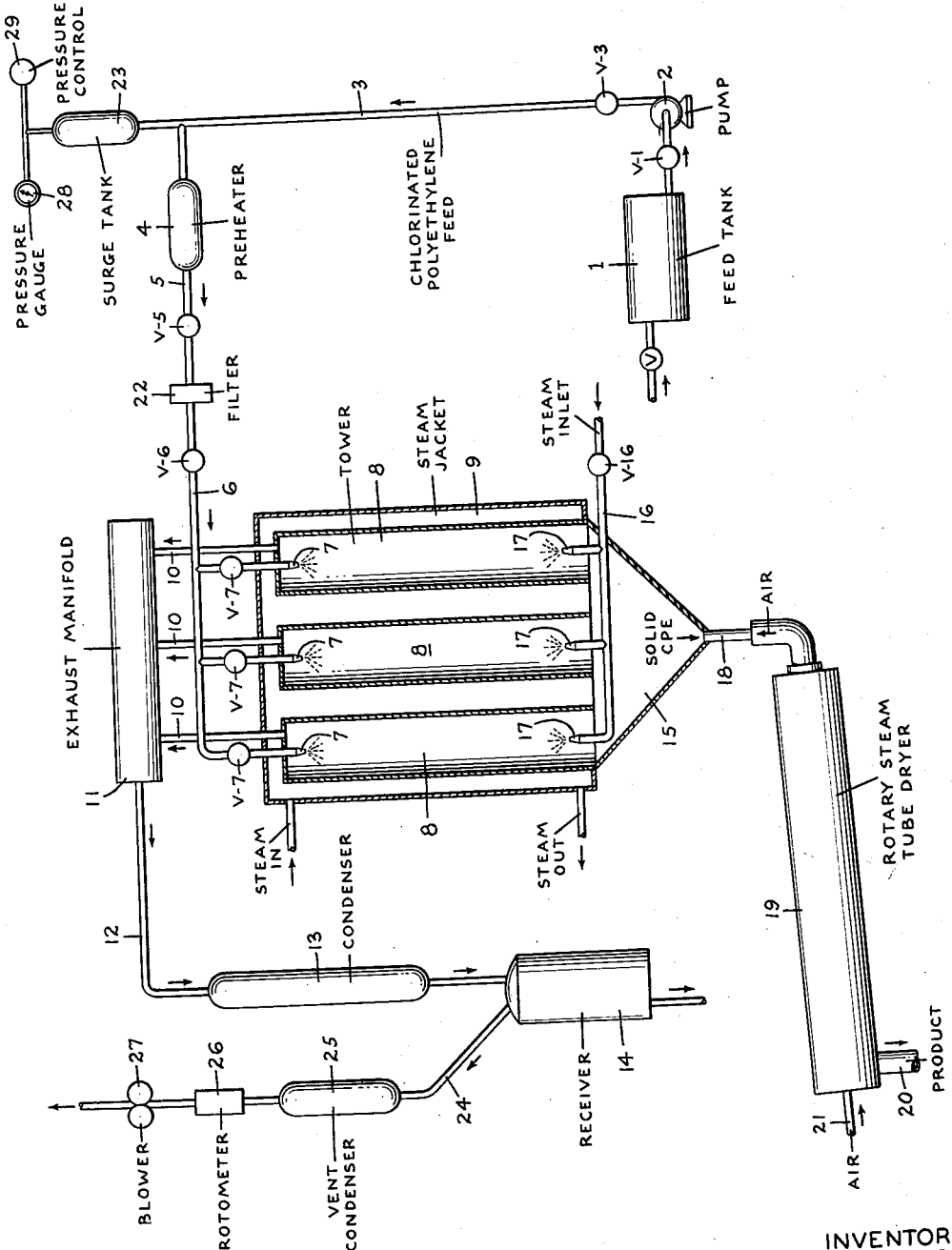

3,074,923
RECOVERY OF CHLORINATED POLYETHYLENE
WAX FROM SOLUTION BY SPRAY DRYING
John N. Cosby, Morris Township, Morris County, and
Charles J. Klasen, Morristown, N.J., assignors to Allied
Chemical Corporation, New York, N.Y., a corporation
of New York
Filed Aug. 20, 1959, Ser. No. 834,975
8 Claims. (Cl. 260—94.9)

This invention relates to a process for separating normally solid, chlorinated polyethylene products from solutions thereof in water-immiscible volatile solvents, and more particularly to a process in which recovery of the chlorine-stable solvent chlorinating medium is readily effected with concomitant production of a pulverulent, non-sticky, free flowing, finely divided solid chlorinated polyethylene product.

It is known to chlorinate polyethylenes, including waxy polyethylenes and oxidized waxy polyethylenes, to produce resinous solids containing up to about 72% by weight chlorine content. Such chlorinations may be carried out by dispersing the polyethylene in a chlorine-stable liquid such as carbon tetrachloride, and bubbling molecular chlorine through the dispersion at elevated temperatures in the presence of light, for example, as disclosed in U.S. Patent No. 2,779,754 of Michael Erchak, Jr. and U.S. application Serial No. 692,485 of John C. Eck and William C. Kraemer, filed October 25, 1957, now U.S. Patent No. 2,964,517.

The chlorinated polyethylene materials described in the above disclosures are characterized by high degrees of solubility at normal room temperatures (20–25° C.), in liquid aromatic hydrocarbons, cyclo-aliphatic unsaturated hydrocarbons and ketones, and chlorinated derivatives of the above, from which they deposit hard tenacious films on solvent removal, which have a high degree of flame resistance and, in certain cases, water repellency as well. The chlorinated polyethylene materials of this character are, therefore, useful in the preparation of coating compositions for various surfaces, including metal, wood, paper, masonry and the like.

Chlorinated polyethylene products have been separated from solution in the chlorinating solvent by precipitation by means of an anti-solvent, for example, an alcohol, such as methanol, followed by filtration and drying.

It has also been suggested to isolate chlorinated polyethylenes, particularly those of high molecular weight or low chlorine content, from the solvent by passing the solution into water maintained at a temperature near the boiling point of the water, and flash distilling off the lower boiling solvent, e.g. carbon tetrachloride. In this latter process the chlorinated polyethylene collects as a white solid floating on the water, from which it can be strained off.

The flash distillation recovery process above described, while having certain operating advantages over the methanol precipitation process, is especially unsatisfactory and unsuitable for the recovery of the chlorinated low molecular weight polyethylenes resulting from chlorination to between about 65% and about 72% chlorine, of polyethylene waxes initially having average molecular weights between about 1,000 and about 5,000 and oxidized polyethylene waxes having average molecular weights between about 600 and about 5,000. When such chlorinated polyethylene solutions in e.g. carbon tetrachloride, are poured into hot water, in an attempt to remove the carbon tetrachloride by volatilization, the resulting product, as it solidifies, becomes a sticky gummy mass due to the lowered fusion point of the low molecular weight, solvent-contaminated product. This product sticks to the walls of the container and to the agitator mechanism and agglomerates with itself to form an impenetrable, spongy blanket on the top of the container which not only is difficult to handle, but effectively prevents further escape of volatilized solvent. Consequently the chlorinated low molecular weight, high chlorine content polyethylene products so recovered are subject to high mechanical handling losses.

Chlorinated polyethylene products recovered by contacting with water or alcohol as above described also contain relatively high percentages of residual solvent, sometimes as high as 8 to 10%, which render the products unsuited for many purposes. The presence of the solvent lowers the fusion point of the product, renders it malodorous, and constitutes a toxic hazard when the product is used as a coating for food containers and the like. Accordingly, to be commercially acceptable, a chlorinated low molecular weight polyethylene resin product should have a residual solvent content of not more than about 5%, and, for certain uses, not more than about 2%, preferably less.

The influence of carbon tetrachloride content on the fusion point of a chlorinated polyethylene containing about 70% chlorine prepared from a waxy polyethylene of molecular weight of about 2,000 is show in Table I below:

TABLE I

Influence of Carbon Tetrachloride Content on Fusion Point of 70% Chlorine Content Polyethylene

| $CCl_4$ content, percent by weight: | Fusion point, ° C. |
|---|---|
| 8.0 | 205 |
| 4.9 | 212 |
| 3.3 | 215 |
| 1.7 | 219 |
| 0.0 | 222 |

It is an object of the present invention to provide a process for recovering chlorinated polyethylene resins having fusion points of about 165° C. and above from fluid solvent solutions thereof, in the form of finely divided particulate matter.

It is a further object of our invention to provide a process for recovering chlorinated low molecular weight polyethylene resins containing at least about 65% by weight of chlorine from solvent solutions thereof, in the form of finely divided solid particulate matter of low residual solvent content.

A further object of the invention is to provide a process for recovering chlorinated polyethylene resins from solvent solutions thereof wherein relatively low temperatures are employed and wherein recovery of removed solvent for reuse may readily be effected.

A further object is to provide a process which avoids thermal degradation of the chlorinated polyethylene.

These and other objects are accomplished according to our invention wherein a fluid solution of chlorinated polyethylene having a fusion point when solvent-free of at least about 165° C., in a chlorine-stable, water-immiscible solvent having a boiling point below about 100° C. is heated to a temperature above the normal boiling point of the solvent, placed under a superatmospheric pressure sufficient to prevent volatilization of the solvent, and is then atomized into an ascending current of steam in an inert gaseous stream maintained at elevated temperature and at a pressure lower than the initial pressure on the chlorinated polyethylene solution, whereby solvent in the thus atomized droplets is substantially immediately volatilized to the extent that solid, particulate chlorinated polyethylene resin is produced, contacting said particulate resin with steam until the solvent content of particulate product is not more than about 10% and thereafter, if desired, contacting solid particulate resin with a countercurrent stream of hot inert gas, whereby additional solvent and condensed water are volatilized and removed from the resin particles, and wherein all the vapors thus produced, including solvent, steam, water vapor and inert gas are merged in a common vapor stream and cooled to condense solvent and water vapor.

In the drawing, numeral 1 represents a feed tank connected through pump 2 and feed line 3 to preheater 4 connected through line 5 with header 6 terminating in a plurality of spray nozzles 7. The nozzles 7 project into the tops of towers 8, mounted vertically in a jacket or housing 9. The upper ends of the towers 8 are closed except for openings for thermowells (not shown), feed nozzles 7 and exhaust lines 10, leading to common exhaust manifold 11, which connects through line 12 with condenser 13 and receiver 14. The bottoms of towers 8 are open to common hopper 15 through which passes steam inlet 16 provided with steam exit terminals 17 located at the bottoms of towers 8. Common hopper 15 connects through neck 18 with rotary steam tube dryer 19 provided with product outlet 20, and air inlet 21. The several feed lines are provided with valves shown as V–1; V–2; V–5; V–6; V–7, etc. Filters 22 may be positioned in any of the lines as required. Surge tank 23 is shown positioned above preheater 4, and is connected with pressure gauge 28 and pressure control 29, for example, a "Mercoid" control. Condensate receiver 14 is connected to blower 27 by line 24, vent condenser 25 and rotameter 26.

In operation, the fluid solution of chlorinated polyethylene resin is pumped from feed tank 1, through line 3 into preheater 4 where its temperature is raised to the desired level, for example, about 150° C. The preheated solution is maintained under sufficient pressure to prevent premature flashing of the solvent. The solution is then fed through line 5, filter 22 and header 6, to nozzles 7 where it is atomized into lower pressure zone 8 (maintained at elevated temperature as by introduction of steam into jacket 9), where a considerable portion of the solvent flash distills, producing solid droplets or snow-like flakes which fall downwardly, countercurrent to an ascending current of steam rising upwardly through towers 8. Flash evaporated solvent is carried upward through exhaust lines 10 into manifold 11 thence to condenser 13 and receiver 14. Steam under low pressure is introduced through steam inlet 16 and into towers 8 through ports 17, and rises through the towers in contact with the descending solid particles of chlorinated polyethylene. The hot steam volatilizes additional solvent, and a portion of the steam condenses on the solidified particles giving up latent heat and causing further volatilization of solvent. These vapors are carried upwardly with the rising steam, merging with the flash distilled solvent and similarly exit through lines 10 into manifold 11, condenser 13 and receiver 14. The solid particulate chlorinated polyethylene drops from the towers into hopper 15 and thence into rotary dryer 19 and, after elimination of water and more solvent, exits at 20. Actuation of blower 27 maintains the entire system under a slight vacuum, drawing a small amount of air into the system, providing for continuous exhaust of vapors through the condenser system, and prevents leakage of toxic carbon tetrachloride into the ambient atmosphere. Provision is made for entry of air into the system through the rotary dryer, for example at 21, besides which air is drawn in through cracks in the system. An air rate of 7–9 cu. ft. per minute through the blower has been found suitable in operations using towers of 16 inch diameter by 9 feet in height.

Most of the solvent and water vapors are condensed in the primary condenser 13, the remainder is removed in the vent condenser 25, both of which drain into receiver 14, from which the carbon tetrachloride can be recovered for reuse.

Our process is applicable to any chlorinated polyethylene resin material which has a fusion point of at least about 165° C. and which forms fluid solutions in the chlorine-stable solvents as defined. Chlorinated polyethylene materials illustrative of those to which our invention applies are obtained by chlorination to from about 65% to about 72% chlorine content, of the normally solid, hard, waxy polymers of ethylene which are saturated aliphatic compounds characterized by a recurring —$CH_2$— group, and which have average molecular weights between about 1,000 and about 5,000 by the Staudinger viscosity method (Harris, J. Polymer Science, vol. VIII, No. 4, pp. 353–364, April 1952), especially the polyethylene/alkanol telomer waxes of this character. These polymers of ethylene may be prepared, for example, by subjecting ethylene, either alone, or in the presence of a co-reactant, to temperatures between about 150° C. and about 300° C., and pressures ranging from about 500 p.s.i. to about 7000 p.s.i. If a co-reactant is used, it may be, for example, a normally liquid organic compound, free of olefinic unsaturation, e.g. consisting of carbon, hydrogen and oxygen, for example, lower ($C_2$ to $C_4$) alkanols, such as ethanol, n-propanol, isopropanol, n-butanol, secondary butanol or isobutanol, a ketone such as acetone, an ether, an alkane, an alkyl benzene, etc. When ethylene is thus polymerized in the presence of a co-reactant, for example, as disclosed in U.S. Patents 2,683,141 and 2,504,400 of Michael Erchak, Jr., a "telomer" is formed, which is essentially polyethylenic, and contains as a terminal addition to its polyethylene chain, a radical of the co-reactant. Such polyethylene waxes, containing an alcohol group in their structures, are referred to as polyethylene/alkanol telomers. A process for chlorinating such waxes is described in U.S. Patent 2,779,754 of Michael Erchak, Jr.

The process of our invention is also applicable to other chlorinated polyethylene materials, such as those obtained by chlorinating the oxidation products of the polyethylene waxes described above, which have been oxidized, as described in co-pending application Serial No. 515,770 of Michael Erchak, Jr., by subjecting such waxes, especially the polyethylene/alkanol telomer waxes having average molecular weights between about 1,000 and about 5,000 (Staudinger), in the liquid phase to the action of an oxygen-containing gas to cause the reaction of at least about 5 pounds of oxygen per 100 pounds of wax, preferably between about 10 pounds and about 17 pounds of oxygen per 100 pounds of wax, i.e. to provide an oxidized polyethylene wax containing at least about 3%, preferably between about 6% and about 9% of oxygen by weight, based on the weight of the oxidized wax, and acid numbers of not more than about 60, preferably between about 20 and about 50. The oxidized polyethylene/isopropanol telomer waxes prepared according to the above method are especially preferred. A process for chlorinating such waxes is disclosed in the co-pending appplication of John C. Eck and William C. Kraemer, above referred to. Chlorinated, oxidized products prepared according to the above process to provide resinous products containing from about 65% to about 72% chlorine by weight are preferably utilized in our invention.

Starting with polyethylene waxes, such as the polyethylene/alkanol telomer waxes having average molecular weights from about 1,000 to about 3,000, and the oxidized polyethylene/alkanol telomers having average molecular weights from about 600 to about 3,000, chlorination of these waxes to the extents indicated, produces chlorinated products of considerably higher average molecular weights than the starting waxes, for example from about 1,500 to about 10,000 or higher, the higher chlorine content products in general having the higher average molecular weights.

The water-immiscible, chlorine-stable solvent medium in which the chlorinated polyethylene materials of the invention are dissolved, and from which solvent is removed according to the present invention have boiling points below that of water, i.e., below 100° C. under standard atmospheric conditions, preferably between about 30° C. and about 90° C., although solvents having lower boiling points, i.e. down to about 10° C. may be used if desired, but may present added operating difficulties. Suitable solvents include halogenated aliphatic hydrocarbons in the above boiling point range, for example, carbon tetrachloride, B.P. 76.7° C., chloroform, B.P. 61.2° C., methylene chloride, B.P. 40.1° C., ethylene chloride, B.P. 38.7° C., and trichlorofluoromethane, B.P. 24.1° C. Carbon tetrachloride is the preferred solvent because it is the solvent medium customarily used in the chlorination of the polyethylene waxes as defined above, and because of its high chlorine stability, ready availability and its advantageous boiling point, well below the boiling point of water but not so low as to volatilize unduly at normal atmospheric temperatures.

For the success of our process the initial flashing of the solvent must be such as to cause immediate solidification of the atomized flakes or droplets with the formation of substantially solid particles which fall in snow-like form down through the tower. If the spray remains molten it will impinge on and adhere to the tower walls and run down the walls in molten form and into the hopper, thus preventing sufficient contact with the steam to volatilize the solvent. Chlorinated polyethylene resins having fusion temperatures (solvent-free) of at least about 165° C. may readily be separated from solvent solutions thereof by the process of our invention. These include the chlorination products of the waxy polyethylenes having average molecular weights (Staudinger) of between about 1,000 and about 5,000 which contain at least about 65% chlorine, preferably between about 65% and about 72% chlorine. These chlorinated polyethylene resins usually have fusion temperatures, when solvent-free, between about 190° C. and about 220° C.

Adequate initial flashing of solvent from such resins may be achieved by maintenance and correlation of solution conditions, including concentration, temperature, pressure, etc. and steam zone conditions as described hereinafter.

Solution concentration should be low enough to produce a fluid mass susceptible to atomization, but high enough so as not to require excessive heat input for effecting volatilization of the solvent, for example, solutions having viscosities between about 40 centipoises and about 250 centipoises at 25° C. are satisfactory. In general, solutions containing between about 10% and about 25% solids are satisfactory. Preferred concentrations are between about 12% and about 20%. Temperature of the solution at the point of atomization should be above the boiling point of the solvent, for example between about 100° C. and about 160° C. The solution should be maintained under a sufficiently high pressure to prevent excessive vaporization of the solvent in the feed lines at the temperatures used. When the solvent is carbon tetrachloride, temperatures between about 140° C. and about 160° C. and pressures between about 50 p.s.i.g. and about 70 p.s.i.g. are satisfactory. While the initial steam temperature may vary considerably, it is advantageously near or below the "tack" point of the chlorinated polyethylene in order to minimize the possibility of agglomerating the product. Steam used may suitably be "low pressure" steam, for example between about 50 p.s.i.g. and about 75 p.s.i.g., and will usually enter the volatilization zone at temperatures between about 100° C. and about 160° C. Pressures in the volatilization zone will be less than that on the solution at the atomization point, usually approximately atmospheric pressure or slightly above or below, depending somewhat on the pressure on the steam as initially introduced, and on flow rate of the air-vapor stream through the system, which tends to evacuate the system.

Suitable vapor rates through the system will preferably range between about 15 cu. ft. and about 25 cu. ft. per minute per pound of solvent in the solution fed, at standard temperature and pressure.

The rate of introduction of chlorinated polyethylene solution into the steam zone for volatilization, the quantity and temperature of the counter-current steam and the time of contact will vary somewhat with the concentration of the solution, the steam pressure and the residence time provided. These conditions will be regulated and coordinated so that sufficient solvent will be evaporated from the atomized droplets during their passage through the steam, to leave chlorinated polyethylene material in the form of solid particles which have virtually no tendency to agglomerate, i.e. which have solvent contents no greater than about 10% and fusion points of at least about 165° C. For satisfactory solvent removal from the solidified droplets, the quantity of steam fed should be at a rate of at least about 0.4 part of steam per part of solvent in the chlorinated polyethylene solution introduced. In general a feed rate of between about 0.4 part and about 0.8 part of steam per part of solvent in the solution will be satisfactory, the lesser quantities being used when higher pressure steam or higher concentration solutions are employed. Residence times of contact between steam and solid droplets should be sufficient to reduce the solvent content to not more than about 10% preferably to between about 6% and about 10%, the time usually varying between about 0.75 second and about 1.5 seconds under preferred conditions of solution and steam temperature.

At the low solvent content of about 10% or less the resulting particulate resin is a solid granular mass which exhibits virtually no tendency to agglomerate.

The resin particles, however, contain considerable moisture, usually between about 5% and about 10%. If it is desired to produce a dry, low-solvent content product, water and additional solvent may be removed by passing the resin product into a locus of low solvent vapor content counter-current to a stream of hot inert gas such as air, which may be maintained at the required temperature of between about 140° C. and about 160° C. by low pressure (e.g. 50–75 p.s.i.g.) steam in a steam tube dryer. Contact with hot gas is maintained until the desired reduction in moisture and solvent content has been effected, for example by one or more passes through the dryer, usually until water has been reduced to no more than about 0.1% and solvent content to not more than about 5%, preferably to not more than about 2%. The water and solvent vapors are carried by the hot aid stream upward into the steam zone and exit into the common exhaust zone with solvent and water vapor from this zone, from which all the vapors are led into a single condenser where separation of solvent and water is readily effected. The process makes use of not only the sensible heat of the hot steam but the latent heat of condensation of the steam as well.

By counter-current flow of vapors from the final dryer zone, up through the steam contacting zone and flash drying zone, all of the solvent vapors may be concentrated in a single condenser system in which water is the only other component. This water-solvent mixture is readily condensible by simple cooling, and layering of the mutually immiscible liquids makes for easy separation of the components and recovery of the solvent for reuse.

The recovered chlorinated polyethylene resins are useful in printing inks and lacquer type coatings, especially those in which a hard finish is desired.

The following specific example further illustrates our invention. Parts are by weight except as otherwise noted.

*Example*

A solution in carbon tetrachloride containing 16% of a chlorinated polyethylene of 70% chlorine content and a fusion point of about 220° C., obtained by chlorinating a polyethylene of average molecular weight of about 2,000 by contacting a carbon tetrachloride suspension thereof with chlorine gas, was preheated to 150° C. and fed under pressure of about 50-60 p.s.i.g. at a rate of 120 pounds per hour to a series of spray nozzles located in the tops of a plurality of towers enclosed in a steam jacketed tank, and opening into a common hopper. Into the bottom of each tower was fed superheated steam under a pressure of about 60 p.s.i., and at a temperature of about 150-160° C. at a rate of about 75 pounds per hour, the pressure in the zone being approximately atmospheric. The chlorinated polyethylene solution was atomized at the nozzles into the ascending current of superheated steam, which caused volatilization of the carbon tetrachloride and virtually immediate production of solid particles from which additional solvent was volatilized by contact with the steam and by condensation of a portion of the steam thereon. Exhaust steam and carbon tetrachloride vapors were withdrawn from the tops of the towers into a common exhaust manifold, thence to the recovery system. The granular non-tacky product thus formed, containing about 8% of carbon tetrachloride and about 9% of water, dropped by gravity into the common hopper, and thence was fed at a rate of about 23 lbs. per hour to a rotary steam tube dryer rotating at 3 r.p.m. and through the tubes of which 70-75 p.s.i.g. steam was circulated, in which water and additional carbon tetrachloride volatilized. Air was fed into the exit end of the rotary dryer at 7-9 cubic feet per minute and swept the vapors back into the hopper and thence through the towers into the common exhaust manifold. After passing once through the rotary dryer, the solid chlorinated polyethylene emerged at the rate of 20 pounds per hour as a product containing 4% carbon tetrachloride and 1% water. A second pass through the rotary dryer reduced the carbon tetrachloride content to 2%, the water content to 0.1%.

While the above describes the preferred embodiments of the invention, it will be understood that departures may be made therefrom within the scope of the specification and claims.

We claim:
1. The process for removing solvent from chlorinated polyethylene resins containing between about 65% and about 72% chlorine and having fusion points of at least about 165° C. when solvent-free, which comprises atomizing a fluid solution of said resin in a chlorine-stable, water-immiscible solvent having a normal boiling point below about 100° C., at a temperature above the normal boiling point of said solvent and at a pressure sufficient to inhibit volatilization of said solvent, downwardly into a gaseous zone of lower pressure counter-current to an ascending current of steam, simultaneously introducing into said zone of lower pressure, below the point of atomization of the resin solution, steam under a pressure between about 50 p.s.i.g. and about 75 p.s.i.g. and at a temperature between about 100° C. and about 160° C. at a rate between about 0.4 part and about 0.8 part of steam per part of solvent in the resin solution introduced, whereby solvent in the atomized resin solution is substantially immediately volatilized to the extent that a solid, particulate resin product is formed continuing, counter-currently contacting said descending particulate solid resin product with said ascending steam at said elevated temperature until the particulate product contains not more than about 10% solvent.

2. The process according to claim 1 wherein the solvent is carbon tetrachloride.

3. The process for removing solvent from chlorinated polyethylene resins containing between about 65% and about 72% chlorine and having fusion points of at least about 165° C. when solvent-free, which comprises atomizing a fluid solution of said resin in a chlorine-stable, water-immiscible solvent having a normal boiling point below about 100° C., at a temperature above the normal boiling point of said solvent and at a pressure sufficient to inhibit volatilization of said solvent, downwardly into a gaseous zone of lower pressure counter-current to an ascending current of steam, simultaneously introducing into said zone of lower pressure, below the point of atomization of the resin solution, steam under a pressure between about 50 p.s.i.g. and about 75 p.s.i.g. and at a temperature between about 100° C. and about 160° C. at a rate between about 0.4 part and about 0.8 part of steam per part of solvent in the resin solution introduced, whereby solvent in the atomized resin solution is substantially immediately volatilized to the extent that a solid, particulate resin product is formed continuing, counter-currently contacting said descending particulate resin product with said ascending steam at said elevated temperature until the particulate solid product contains not more than about 10% solvent and between about 5% and about 10% water, contacting said moist particulate mass with a counter-current stream of an inert gas at a temperature between about 140° C. and about 160° C. for a time sufficient to reduce the water content of the mass to not more than about 0.1%, and recovering the dehydrated solid particulate resin product.

4. The process according to claim 3, wherein the counter-currently flowing stream of steam and inert gas both carrying volatilized solvent are first merged, then separated from said zone of lower pressure and subjected to cooling whereby solvent and water condense and separate into layers, and recovering the thus separated solvent.

5. The process according to claim 3, wherein the resin solution as atomized into the lower pressure zone is at a temperature between about 140° C. and about 160° C. and a pressure between about 50 p.s.i.g. and about 70 p.s.i.g. and wherein the pressure in the lower pressure zone is approximately atmospheric.

6. The process for removing solvent from chlorinated polyethylene resins containing at least about 65% chlorine and having fusion points of at least about 165° C. when solvent-free, which comprises atomizing a fluid solution of said resin in a solvent having a normal boiling point below about 100° C., at a temperature above the normal boiling point of said solvent and below the fusion temperature of the resin, said solution being held, prior to atomization at a pressure to inhibit volatilization of said solvent, downwardly into a gaseous zone of lower pressure countercurrent to an ascending current of steam, simultaneously introducing into said zone of lower pressure at a point below the point of atomization of the resin solution, steam under pressure and at an elevated temperature above the boiling point of the solvent and below the fusion temperature of the resin, at a ratio of at least about 0.4 part of steam per part of solvent in the atomized resin solution whereby solvent is substantially immediately volatilized to the extent that a solid, particulate resin product is formed, continuing contacting said descending, particulate, solid resin product with steam at said elevated temperature until the solid particulate resin product contains not more than about 10% solvent.

7. The process according to claim 6 wherein the chlorinated polyethylene resin is the product of chlorination of a waxy polymer selected from the group consisting of polyethylene/alkanol telomers having average molecular weights between about 1,000 and about 3,000 and oxidized polyethylene/alkanol telomers having oxygen contents between about 3% and about 9% and having average molecular weights between about 600 and about 3,000.

8. The process for removing solvent from chlorinated polyethylene resins containing at least about 65% chlorine and having fusion points of at least about 165° C. when solvent-free, which comprises atomizing a fluid solution of said resin in a chlorine-stable, water-immiscible solvent having a normal boiling point below about 100° C., at a temperature above the normal boiling point of said solvent and at a pressure sufficient to inhibit volatilization of said solvent, downwardly into a gaseous zone of lower pressure countercurrent to an ascending current of steam, simultaneously introducing into said zone of lower pressure, below the point of atomization of the resin solution, steam under a pressure of at least about 50 p.s.i.g. and at a temperature between about 100° C. and about 160° C. at a rate of at least about 0.4 part of steam per part of solvent in the resin solution introduced, whereby solvent in the atomized resin solution is substantially immediately volatilized to the extent that a solid particulate resin product is formed, continuing countercurrently contacting said descending particulate solid resin product with said ascending steam at said elevated temperature until the particulate product contains not more than about 10% solvent.

References Cited in the file of this patent

UNITED STATES PATENTS

| | | |
|---|---|---|
| 2,500,194 | McConnel et al. | Mar. 14, 1950 |
| 2,697,694 | Shalit et al. | Dec. 21, 1954 |
| 2,731,452 | Field et al. | Jan. 17, 1956 |
| 2,845,410 | De Vault et al. | July 29, 1958 |
| 2,906,743 | Heitzer et al. | Sept. 29, 1959 |
| 2,949,447 | Hawkins et al. | Aug. 16, 1960 |

FOREIGN PATENTS

| | | |
|---|---|---|
| 498,396 | Great Britain | Jan. 6, 1939 |
| 609,560 | Great Britain | Oct. 4, 1948 |